United States Patent
Choe et al.

(10) Patent No.: US 8,610,738 B2
(45) Date of Patent: Dec. 17, 2013

(54) IMAGE PROCESSING APPARATUS AND METHOD WITH DYNAMIC RANGE PROCESSING

(75) Inventors: Won-hee Choe, Gyeongju-si (KR);
Chang-yeong Kim, Seoul (KR);
Seong-deok Lee, Suwon-si (KR);
Jae-hyun Kwon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 720 days.

(21) Appl. No.: 12/623,386

(22) Filed: Nov. 21, 2009

(65) Prior Publication Data
US 2010/0164976 A1    Jul. 1, 2010

(30) Foreign Application Priority Data

Dec. 26, 2008  (KR) .................. 10-2008-0134507

(51) Int. Cl.
*G09G 5/02*    (2006.01)
(52) U.S. Cl.
USPC ........................................................ 345/590
(58) Field of Classification Search
None
See application file for complete search history.

(56) References Cited

U.S. PATENT DOCUMENTS

| | | | | |
|---|---|---|---|---|
| 5,818,975 A | * | 10/1998 | Goodwin et al. | 382/274 |
| 5,835,618 A | | 11/1998 | Fang et al. | |
| 6,965,693 B1 | | 11/2005 | Kondo et al. | |
| 7,369,160 B2 | | 5/2008 | Fujino et al. | |
| 2003/0234880 A1 | * | 12/2003 | Fukui | 348/272 |
| 2005/0104900 A1 | | 5/2005 | Toyama et al. | |
| 2006/0066925 A1 | * | 3/2006 | Hasegawa et al. | 358/518 |
| 2006/0170707 A1 | * | 8/2006 | Kokemohr | 345/629 |
| 2007/0183656 A1 | * | 8/2007 | Kuwahara et al. | 382/162 |
| 2009/0003708 A1 | * | 1/2009 | Steinberg et al. | 382/190 |

FOREIGN PATENT DOCUMENTS

| | | |
|---|---|---|
| JP | 2003-87650 | 3/2003 |
| JP | 2003-259368 | 9/2003 |
| KR | 10-0783122 | 11/2007 |
| KR | 100783122 | 11/2007 |

\* cited by examiner

*Primary Examiner* — Edward Martello
(74) *Attorney, Agent, or Firm* — NSIP Law

(57) ABSTRACT

An image processing apparatus and method for providing image information about an area of interest are provided. The apparatus and method may perform image processing, including setting at least one area of interest of an input image, analyzing a dynamic range (DR) of the at least one area of interest, and adaptively processing the DR based on a DR of a display device and the analyzed DR of the at least one area of interest, to form a processed image.

18 Claims, 3 Drawing Sheets

IMAGE PROCESSING APPARATUS AND METHOD WITH DYNAMIC RANGE PROCESSING

CROSS-REFERENCE TO RELATED APPLICATION

This application claims the benefit under 35 U.S.C. §119 (a) of a Korean Patent Application No. 10-2008-0134507, filed Dec. 26, 2008 in the Korean Intellectual Property Office, the disclosure of which is incorporated herein by reference in its entirety for all purposes.

BACKGROUND

1. Field

The following description relates to image processing, and more particularly, to an image processing apparatus and method for providing image information about an area of interest.

2. Description of the Related Art

A dynamic range (DR) of a digital image may be defined as a relationship between the brightest pixel value and the darkest pixel value in the image. For example, a dynamic range (DR) of a digital image may be a ratio of the brightest pixel value to the darkest pixel value in the image. A human visual system (HVS) typically can handle a much higher dynamic range than an ordinary camera or monitor. Accordingly, study has been ongoing for capturing a high dynamic range (HDR) image. However, due to the limitation of the conventional display devices, even if HDR images are obtained, there is difficulty in accurately and fully displaying and using them.

SUMMARY

In one general aspect, an image processing apparatus, includes an area of interest setter to set one or more areas of interest of an input image, and a dynamic range (DR) processor to analyze a dynamic range (DR) of the at one or more areas of interest, and adaptively process the DR of the image based on a DR of a display device and the analyzed DR of the one or more areas of interest, to form a processed image.

The area of interest setter may set the one or more areas of interest according to a user input signal.

The area of interest setter may divide the input image into at least two areas and provide divided image area of interest information to a user. The area of interest setter may receive a user selection selecting at least one of the divided areas and set the at least one divided area as the area of interest.

The area of interest setter may create an edge extraction map and set the one or more areas of interest based on the edge extraction map.

The area of interest setter may determine an area of the image having an edge complexity that equals or exceeds a threshold complexity, and set the determined area as the area of interest.

The DR processor may assign the DR of the one or more areas of interest to the DR of the display device to output the input image such that a percentage of the DR of the display device occupied by the DR assigned to the one or more areas of interest equals or exceeds a percentage of the DR of the input image occupied by the DR of the one or more areas of interest, and perform tonal mapping for the one or more areas of interest based on the assigned DR.

The DR processor may assign a DR of an image part outside of the one or more areas of interest to the DR of the display device excluding a part of the DR of the display device assigned to the one or more areas of interest, and perform linear tonal mapping for the image part outside of the one or more areas of interest within the assigned DR for the image part.

The DR processor may generate output images from the input image, wherein the output images have different tonal distributions corresponding to a set number of areas of interest, from the input image having one tonal distribution.

The DR processor may analyze color information of the input image, and perform gamut mapping according to a gamut of the display device assigned based on the adaptively processed DR.

The DR processor may analyze color information per area of interest, determine that at least one color corresponding to a preset color is present in the area of interest, and convert the detected color into a corresponding preferred color.

In another general aspect, an image processing method, includes setting one or more areas of interest of an input image, analyzing a dynamic range (DR) of the one or more areas of interest, and adaptively processing the DR of the image based on a DR of a display device and the analyzed DR of the one or more areas of interest, to form a processed image.

The setting of the one or more areas of interest may include setting the one or more areas of interest according to a user input signal.

The setting of the one or more areas of interest may include dividing the input image into at least two areas, providing divided image area information, receiving a user input signal selecting at least one among the divided image areas, and setting the divided image area selected by the user input signal as an area of interest.

The setting of the one or more areas of interest may include creating an edge extraction map and setting an area of interest based on the created edge extraction map, or setting an area whose edge complexity equals or exceeds a threshold complexity as the area of interest.

The adaptive processing of the DR of the image may include assigning the DR of the one or more areas of interest to the DR of the display device to output the input image such that a percentage of the DR of the display device occupied by the DR assigned to the one or more areas of interest equals or exceeds a percentage of the DR of the input image occupied by the DR of the one or more areas of interest, and performing tonal mapping for the one or more areas of interest based on the assigned DR.

The adaptive processing of the DR of the image may further include assigning a DR of an image part outside of the one or more areas of interest to the DR of the display device excluding a part of the DR of the display device assigned to the one or more areas of interest, and performing linear tonal mapping for the image part outside of the one or more areas of interest within the assigned DR for the image part.

The adaptive processing of the DR of the image may include generating output images from the input image, wherein the output images have one or more tonal distributions that are different from the input image having one tonal distribution, and the one or more tonal distributions corresponding to a set number of areas of interest.

The image processing method may further include analyzing color information of the input image, and performing gamut mapping according to a gamut of the display device assigned based on the adaptively processed DR.

The image processing method may further include analyzing color information per area of interest, determining that at least one color corresponding to a preset color is present in the area of interest, and converting the detected color into a corresponding preferred color.

Other features and aspects will be apparent from the following detailed description, the drawings, and the claims.

Figure 1:
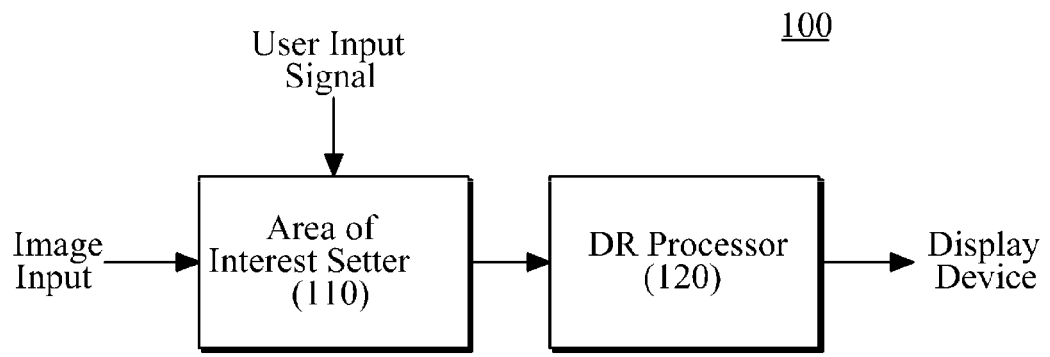
FIG. 1 is a block diagram illustrating an exemplary image processing apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

While processing a digital image, a color model used may be, for example, the red, green, and blue (RGB) model. To more accurately display an image to a display device, it may be beneficial to transform an input image from the original RGB color space to the display device's color space. Typically, the colors perceived by the human eye have a dynamic range (DR) that is greater than that of a display device. During the processing, colors from the RGB which are out of gamut of the display device may be converted to approximate values within the display device's gamut. Simply trimming only the colors which are out of gamut to the closest colors in the destination space may burn the image. There are several algorithms approximating this transformation.

FIG. 1 illustrates an exemplary image processing apparatus 100.

The image processing apparatus 100 includes an area of interest setter 110 and a DR processor 120. As a non-limiting illustration only, the image processing apparatus 100 may be embodied by a camera, an apparatus such as a set top box connected to a camera device, and various imaging devices including a display device.

The area of interest setter 110 sets areas of interest for an input image. For example, an input image may be an image that has been inputted to the image processing apparatus 100, for example, by an image capturing unit, or other imaging apparatus. The input image may be an image having high dynamic range (HDR) image information. The area of interest setter 110 may set one or more areas of interest based on a user input signal, or may automatically set the areas of interest according to a set method.

When the areas of interest are set based on the user input signal, the area of interest setter 110 may set the areas of interest according to location information of an image area indicated by the user input signal. Also, the area of interest setter 110 may divide the input image into, for example, two areas and provide divided image area information to a user, for example, via a display device. When the user input signal selecting at least one area from the divided image area information is received, the area of interest setter 110 may set the selected image area as the area of interest.

When the one or more areas of interest are set according to a preset method, the area of interest setter 110 may set areas automatically. For example, one or more areas matching a focal point may be set as the areas of interest. The areas of interest may be set during image acquisition. The areas of interest may also be set based on information obtained using an edge component extraction. For example, areas where specific objects are located may be set as the areas of interest according to a method of extracting edge components such as extracting facial contours or edges of specific objects. The area of interest setter 110 may set complex edge areas based on edge extraction as the areas of interest.

In general, when the input image is output by a display device whose DR is more limited than the DR of the input image, tones of the input image may be compressed according to uniform compression (or linear compression), and accordingly, some of the detail information of the image may be lost. The image processing apparatus 100 may dynamically perform tonal mapping for the input image based on the area(s) of interest, so as to maintain image information about the area(s) of interest.

Referring back to FIG. 1, the DR processor 120 analyzes a DR of an area of interest. The DR processor 120 may adaptively process a DR of an input image based on a DR of a display device and the analyzed DR of the area of interest, to form a processed image. The processed image may be output to the display device. The DR processor 120 may perform dynamic tonal mapping according to the DR of the area of interest.

The DR processor 120 may analyze a DR per area of interest for an image based on a DR of a display device to output an image with at least one set area of interest. The DR processor 120 may adaptively process the DR of the image based on the analyzed DR per area of interest, and perform dynamic tonal mapping according to the DR of the at least one area of interest.

When the DR processor 120 assigns the DR of an area of interest in the DR of the display device to output the input image, it may make a percentage of the DR of the display device occupied by the DR assigned to the area of interest equal to or larger than a percentage of the DR of the input image occupied by the DR of the area of interest. For example, when the DR processor 120 assigns the DR of an area of interest in the DR of the display device, it may maintain or expand the size of the DR of the area of interest in the DR of the display device in which the DR of the area of interest will be assigned. The DR processor 120 may take an area of interest and expand and assign the area to the display device. The DR processor may take an area of interest and compress and assign the area to the display device. In some embodiments, the DR processor 120 may take a first area of interest and expand and assign the area to the display device, and a take a second area of interest and compress and assign the second portion to the display device. When the one or more areas of interest are assigned to the display device, they may be outputted on a screen or display for a user to view.

The DR processor 120 may assign the DR of an image part outside of the area of interest to the DR of the display device excluding a part of the DR of the display device assigned to the area of interest. The DR processor 120 may perform linear tonal mapping for the image part outside of the area of interest within the assigned DR. The area of interest may have a first DR and the image part outside the area of interest may have a second DR that excludes the first DR. In some embodiments, the first DR of the area of interest may partially overlap with the second DR of the image part outside the area of interest.

The DR processor 120 may generate output images having different tonal distributions corresponding to a set number of areas of interest, from the input image having one tonal distribution. For example, this may be achieved using an image part outside the area of interest that has a DR that is different from the DR of the area of interest. Tonal mapping may be used to alter the DR of the area of interest. Accordingly, output images including image information about one or more areas of interest may have different tonal distributions corresponding to a set number of areas of interest. The output images may be displayed on the display device. In some embodiments, the input image may have a tonal distribution, and tonal mapping may be used to change the tonal distribution of the input image such that the DR of the area of interest is different.

A difference in gamut expressible according to a change in the DR of brightness may be generated. The DR processor 120 may perform gamut mapping for reproducing the input image in colors expressible by the display device.

The DR processor 120 may further analyze color information of the input image, and perform gamut mapping according to a gamut of the display device. For example, the DR processor 120 may simultaneously perform mapping of the DR of an area of interest and gamut mapping. The gamut mapping may be used to enable more optimal gamut expression according to the DR in the display device.

Gamut mapping that can express a given standard of colors may be performed. The DR processor 120 may perform gamut mapping on an image part that is outside the area of interest. The DR of the image part can have a different DR than the area of interest. Thus, the gamut of the area of interest and the gamut of the image part may be different. The DR processor 120 may perform gamut mapping that the display device can express on a part outside of the area of interest, thereby mapping the part outside of the gamut expressed in the area of interest. Gamut mapping may be performed using the image part outside of the area of interest to adjust or alter the gamut of the area of interest.

The DR processor 120 may analyze DR information and color information of the input image, and perform gamut mapping capable of mapping the analyzed DR information and color information to a DR and gamut that can be expressed on the display device. Several methods, for example, gamut compression, gamut clipping, and the like, may be employed as a gamut mapping method. Gamut mapping of color information based on a color space of the input image into a standard red, green, and blue (sRGB) space used by the display device, may be performed.

The DR processor 120 may perform a color expression method with respect to an area of interest. The DR processor 120 may analyze color information of the area of interest, and when at least one color corresponding to a preset color is detected among the analyzed color information, the DR processor 120 may convert the detected color into a corresponding preferred color. For example, when colors like skin color, grass green, sky blue, and the like, to which the human eye is sensitive, are detected in the area of interest, the detected colors may be converted into colors preferred by a user. When multiple areas of interest are processed, the DR processor 120 may analyze color information per area of interest, and when at least one color corresponding to a preset color is detected, the DR processor 120 may convert the detected color into a corresponding preferred color.

In one example, the DR processor 120 may process an area of interest of an input image using a color expression method, and perform the above-described gamut mapping for parts of the input image outside of the area of interest.

In one example, a plurality of images with different brightness distributions may be obtained from one HDR image. This has the same effect as capturing images at varying exposures. A camera user may obtain the same effect as capturing an image by varying exposure several times with only one photography operation. When an image is generated by compressing a wide illumination intensity range of an image, the generated image may be more detailed than an image captured by adjusting the exposure of a narrow illumination intensity range camera several times.

The method and apparatus described herein may be incorporated into medical equipment. Treatment diagnosis may be increased by imaging an area suspected of illness and setting that area as the area of interest. Even when a low dynamic range (LDR) display device is used, more detailed image information can be provided about an area of interest than is ordinarily possible.

By applying gamut mapping and/or performing a color expression method, in addition to DR processing on an area of interest, image information desired by a user in terms of brightness and in terms of color, may be provided for the area of interest.

Figure 2A:
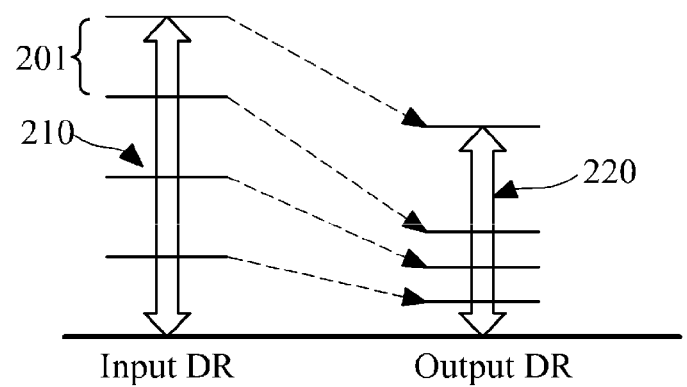
FIGS. 2A, 2B, and 2C are diagrams for illustrating exemplary dynamic range (DR) processing methods.
Figure 2B:
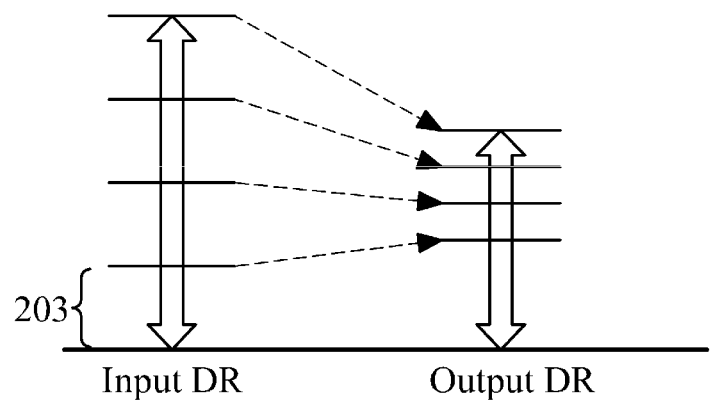
Figure 2C:
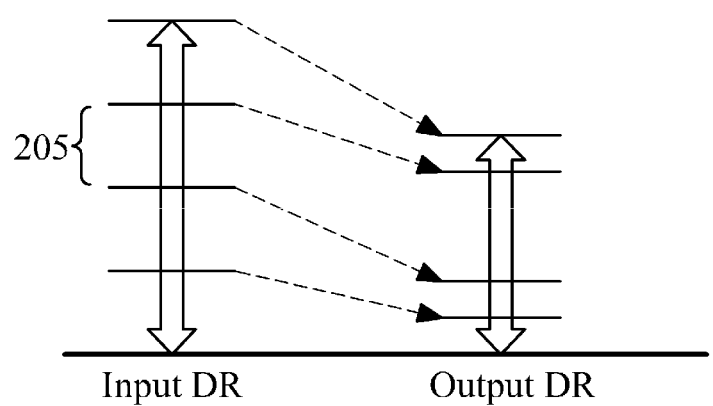

FIGS. 2A, 2B, and 2C are diagrams for illustrating exemplary DR processing methods.

An arrow 210 in FIG. 2A shows the entire DR of an HDR image, and an arrow 220 illustrates the entire DR of a display device. As illustrated, the input DR has a greater range than the output DR. When a DR 201 for an area of interest is located at a high end of the input DR as shown in FIG. 2A, the DR of the area of interest may be expanded and assigned to the DR of the display apparatus as shown in FIG. 2A. The DR of other areas of the image may be linearly compressed and assigned. While FIG. 2A illustrates expansion and assignment of the DR of the area of interest, the size of the DR of the area of interest may be maintained, and the DR of other areas may be linearly compressed and assigned.

FIG. 2B illustrates an example of assigning a DR 203 of an area of interest in the DR of a display device and performing tonal mapping in order to maintain image information for the area of interest when the input image is output on the display device. In this example, the DR of the area of interest is located at a low end of the DR of the input image. The DR of the area of interest may be expanded when the image is assigned to the display device. For example, the display device may display the DR from the low end of the input image at a middle to lower end of the display device DR, as shown in FIG. 2B.

FIG. 2C illustrates an example of assigning a DR 205 of an area of interest in the DR of a display device and performing tonal mapping in order to maintain a range of image information for the area of interest when the input image is output on the display device. In this example, the DR of the area of interest is located at an upper middle part of the DR of the input image. The DR of the area of interest and the DR of other areas of the image may be expanded or compressed and assigned to the display device as shown in FIG. 2C.

Figure 3:
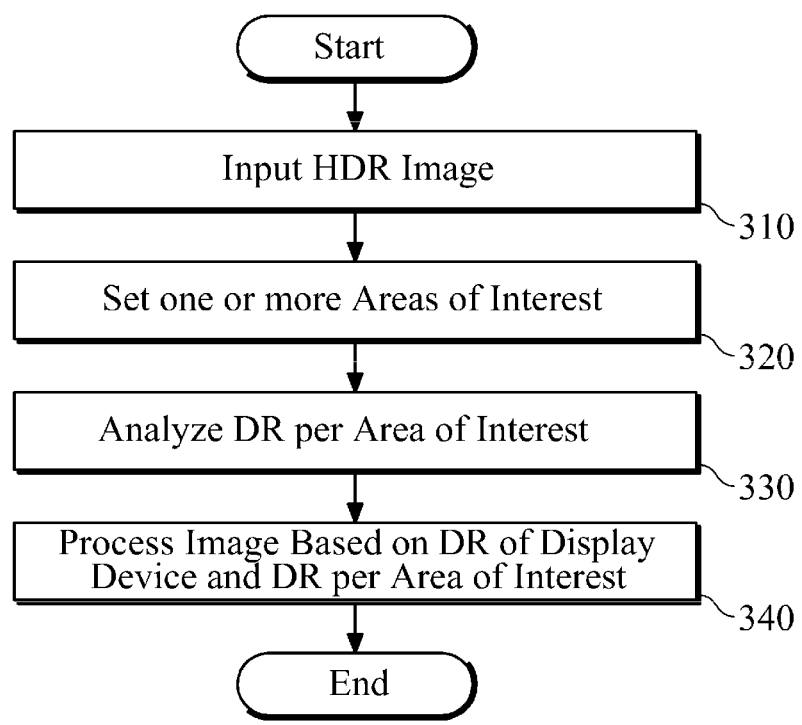
FIG. 3 is a flowchart illustrating an exemplary image processing method.

FIG. 3 is a flowchart illustrating an exemplary image processing method based on areas of interest.

An HDR image is input or received in 310.

One or more areas of interest are set for the input image in 320. The one or more areas of interest may be set according to a user input signal or preset as described herein, for example.

A DR of the one or more areas of interest is analyzed based on the set at least one area of interest in 330. If more than one area of interest is analyzed, the DR per area of interest may be analyzed.

A DR of the image is adaptively processed based on a DR of a display device and the analyzed DR of the one or more areas of interest, to form a processed image in 340. The DR of the imaged may be adaptively processed based on the DR of the display device to output the image and the analyzed DR of the area of interest. A DR of an area of interest may be assigned in the DR of the display device to output the input image such that a percentage of the DR of the display device occupied by the DR assigned to the area of interest equals or exceeds a percentage of the DR of the input image occupied by the DR of the area of interest. The DR of an image part outside of the area of interest may be assigned to the DR of the display device excluding a part of the DR of the display device assigned to the area of interest, and linear tonal mapping may be performed for the image part outside of the area of interest within the assigned DR.

Gamut mapping may be performed according to a gamut of the display device. The gamut mapping also may be performed for the input image. According to an exemplary embodiment, color information of the input image may be further analyzed, and gamut mapping may be further performed according to a gamut of the display device. The gamut of the display device may be assigned based on the adaptively processed DR.

For example, DR and color information of the input image may be analyzed, and gamut mapping may be performed on the analyzed color information based on the DR and gamut of the display device. Color information per area of interest may be analyzed for at least one area of interest. The method may determine that at least one color corresponding to a preset color is detected among the analyzed color information. The detected preset color may be converted into a corresponding preferred color.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

According to example(s) described above, an image processing apparatus and method may be provided to more effectively displaying an input high dynamic range (HDR) image on a limited display device. The image processing apparatus, when processing the HDR image according to a dynamic range (DR) of the display device, may process an area of interest of the HDR image to have a wider DR than an area of the HDR image not of interest. Accordingly, an image part corresponding to the area of interest may have more image information than the other image part.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An image processing apparatus, comprising:
   an area of interest setter to set one or more areas of interest of an input image; and
   a dynamic range (DR) processor configured to analyze a dynamic range (DR) of the one or more areas of interest to determine a scope of the DR used in each of the one or more areas of interest, and adaptively process the DR of the input image based on a DR of a display device and the scope of the DR used in each of the one or more areas of interest, to form a processed image,
   wherein the determined scope of the DR used in the one or more areas of interest is proportionately expanded, and the DR of the input image outside the determined scope is proportionately compressed by a linear tonal mapping, in forming the processed image.

2. The image processing apparatus of claim 1, wherein the area of interest setter sets the one or more areas of interest according to a user input signal.

3. The image processing apparatus of claim 1, wherein the area of interest setter divides the input image into at least two areas and provides divided image area of interest information to a user.

4. The image processing apparatus of claim 3, wherein the area of interest setter receives a user selection selecting at least one of the divided areas and set the at least one divided area as the area of interest.

5. The image processing apparatus of claim 1, wherein the area of interest setter creates an edge extraction map and sets the one or more areas of interest based on the edge extraction map.

6. The image processing apparatus of claim 1, wherein the DR processor assigns the DR of the one or more areas of interest to the DR of the display device to output the input image such that a percentage of the DR of the display device occupied by the DR assigned to the one or more areas of interest equals or exceeds a percentage of the DR of the input image occupied by the DR of the one or more areas of interest, and performs tonal mapping for the one or more areas of interest based on the assigned DR.

7. The image processing apparatus of claim 6, wherein the DR processor assigns the DR of an image part outside of the one or more areas of interest to the DR of the display device excluding a part of the DR of the display device assigned to the one or more areas of interest, and performs the linear tonal mapping for the image part outside of the one or more areas of interest within the assigned DR for the image part.

8. The image processing apparatus of claim 1, wherein the DR processor generates output images from the input image, wherein the output images have different tonal distributions corresponding to a set number of areas of interest, from the input image having one tonal distribution.

9. The image processing apparatus of claim 1, wherein the DR processor analyzes color information of the input image, and performs gamut mapping according to a gamut of the display device assigned based on the adaptively processed DR.

10. The image processing apparatus of claim 1, wherein the DR processor analyzes color information per area of interest, determines that at least one color corresponding to a preset color is present in the area of interest, and converts the detected color into a corresponding preferred color.

11. An image processing method, the method comprising:
setting one or more areas of interest of an input image;
analyzing a dynamic range (DR) of the one or more areas of interest to determine a scope of the DR used in each of the one or more areas of interest; and
adaptively processing the DR of the image based on a DR of a display device and the scope of the DR used in each of the one or more areas of interest, to form a processed image,
wherein the determined scope of the DR used in the one or more areas of interest is proportionately expanded, and the DR of the input image outside the determined scope is proportionately compressed by a linear tonal mapping, in forming the processed image.

12. The image processing method of claim 11, wherein the setting of the one or more areas of interest comprises setting the one or more areas of interest according to a user input signal.

13. The image processing method of claim 11, wherein the setting of the one or more areas of interest comprises:
dividing the input image into at least two areas;
providing divided image area information;
receiving a user input signal selecting at least one among the divided image areas; and
setting the divided image area selected by the user input signal as an area of interest.

14. The image processing method of claim 11, wherein the adaptive processing of the DR of the image comprises:
assigning the DR of the one or more areas of interest to the DR of the display device to output the input image such that a percentage of the DR of the display device occupied by the DR assigned to the one or more areas of interest equals or exceeds a percentage of the DR of the input image occupied by the DR of the one or more areas of interest; and
performing tonal mapping for the one or more areas of interest based on the assigned DR.

15. The image processing method of claim 14, wherein the adaptive processing of the DR of the image further comprises assigning the DR of an image part outside of the one or more areas of interest to the DR of the display device excluding a part of the DR of the display device assigned to the one or more areas of interest, and performing the linear tonal mapping for the image part outside of the one or more areas of interest within the assigned DR for the image part.

16. The image processing method of claim 11, wherein the adaptive processing of the DR of the image comprises generating output images from the input image, wherein the output images have one or more tonal distributions that are different from the input image having one tonal distribution, and the one or more tonal distributions corresponding to a set number of areas of interest.

17. The image processing method of claim 11, further comprising:
analyzing color information of the input image; and
performing gamut mapping according to a gamut of the display device assigned based on the adaptively processed DR.

18. The image processing method of claim 11, further comprising:
analyzing color information per area of interest;
determining that at least one color corresponding to a preset color is present in the area of interest; and
converting the detected color into a corresponding preferred color.

* * * * *